March 8, 1932. J. L. DRAKE 1,848,113
METHOD AND APPARATUS FOR FORMING SHEET GLASS
Original Filed Oct. 20, 1928 2 Sheets-Sheet 1
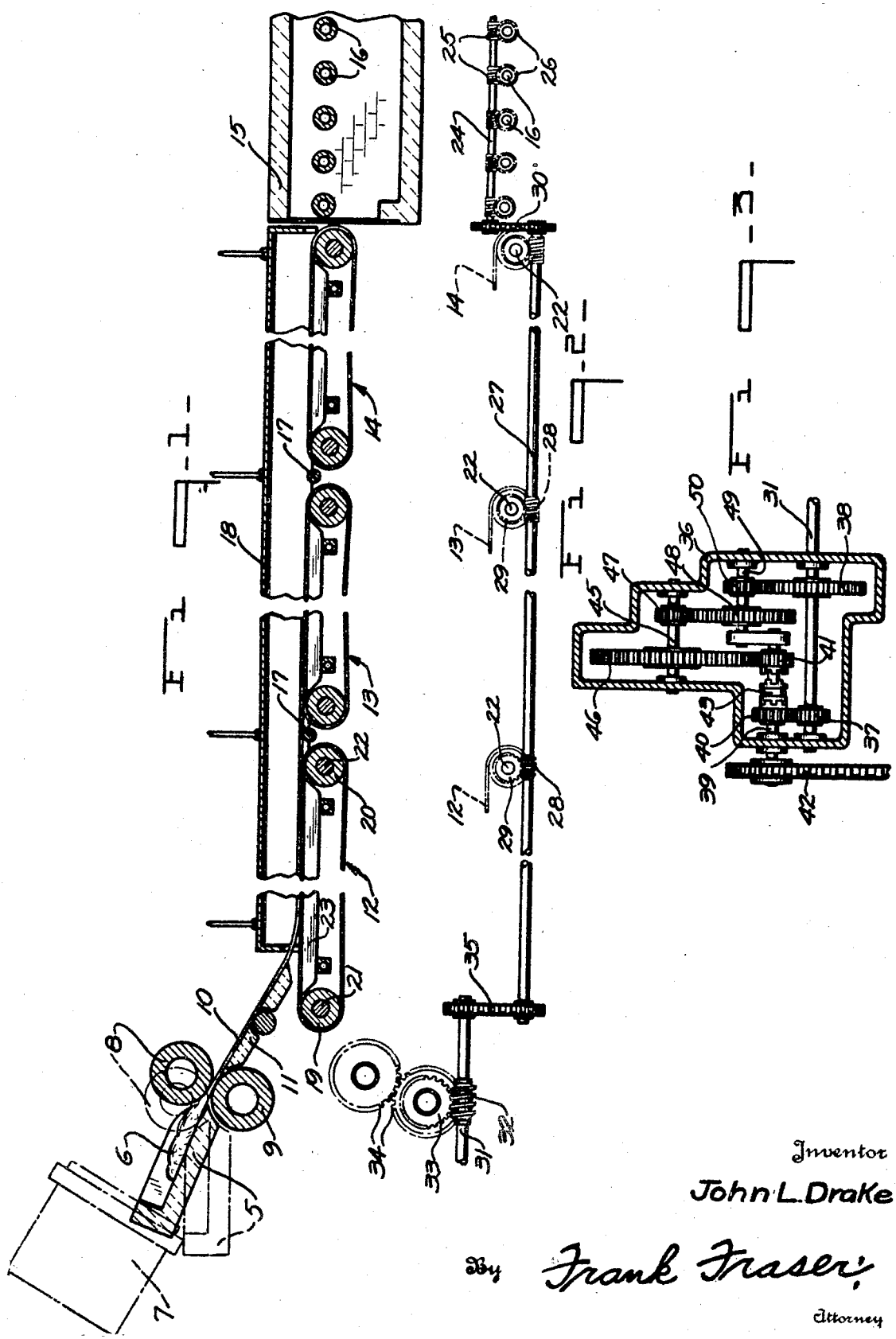
Inventor
John L. Drake
By Frank Fraser,
Attorney

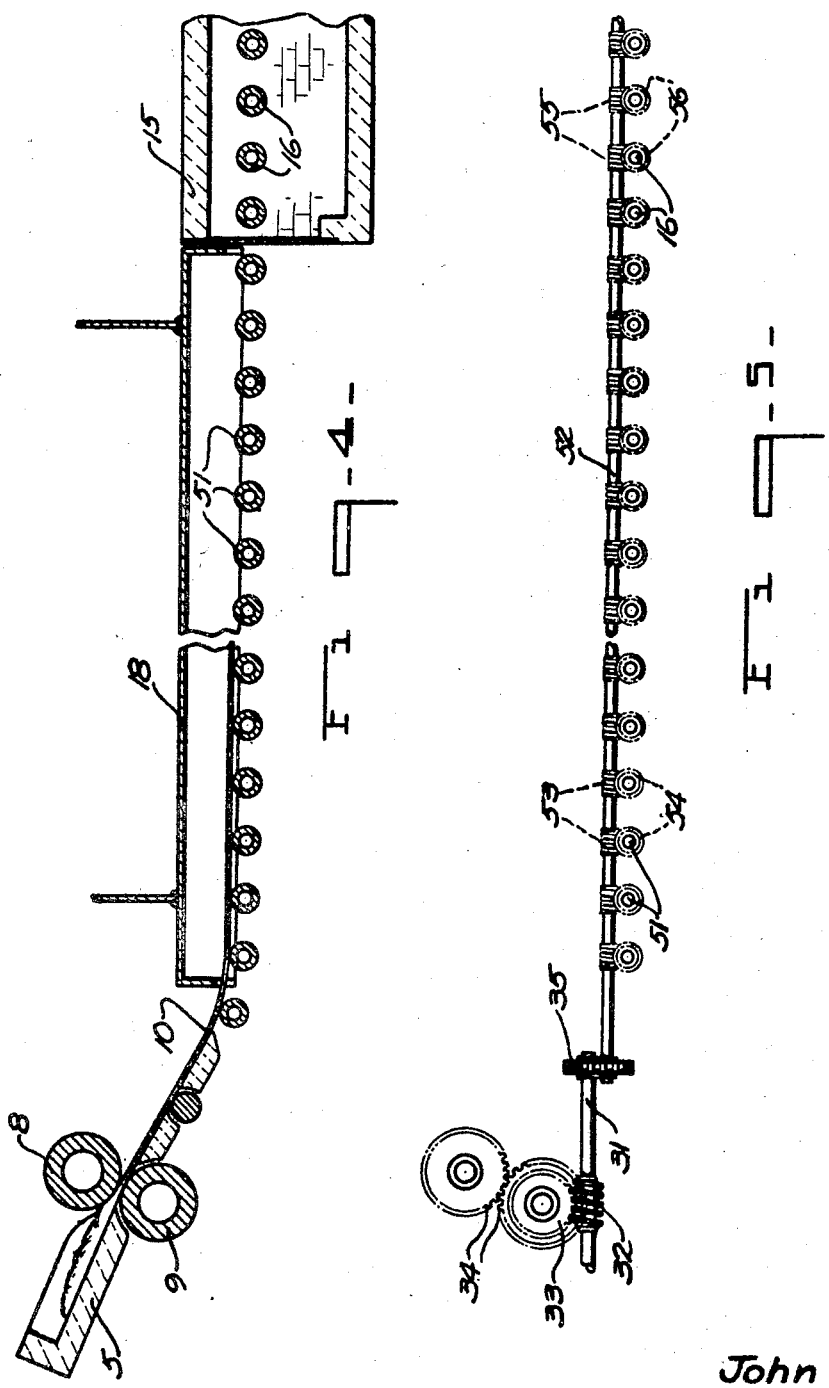

Patented Mar. 8, 1932

1,848,113

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR FORMING SHEET GLASS

Application filed October 20, 1928, Serial No. 313,680. Renewed August 12, 1931.

This invention relates broadly to the manufacture of sheet glass and more particularly to a method of and apparatus for forming sheet glass by an intermittent rolling operation.

In the manufacture of sheet glass according to one method, a plurality of successive sheets are intermittently rolled at predetermined intervals from a series of charges or pours of molten glass. The molten glass is preferably melted and refined in a suitable receptacle or pot and poured therefrom onto a receiver from where it is moved to and passed between a pair of forming rolls and reduced thereby to a sheet of substantially predetermined and uniform thickness. In the method just described it is desirable that the molten glass passing to the forming rolls be rapidly reduced to sheet form. This is advisable for the reason that the glass will not become unduly chilled before it is formed into a sheet and further, the contact of the glass with the relatively cool forming rolls will be relatively short, so that the surfaces of the glass sheet will not be unduly marred. Also, by rolling the glass at a relatively high rate of speed, production can be accelerated. While it is expedient to reduce the glass rapidly to sheet form, it is not necessary that the glass be annealed while traveling at this same high rate of speed and in fact, such is undesirable for the reason that in this event, the length of annealing leer necessary would have to be exceedingly long. For example, if the glass be rolled to sheet form at the rate of sixty feet per minute and should it require sixty minutes to anneal the glass, it will be seen that the length of the leer would have to be 3600 feet. The disadvantages incident to the construction, operation and maintenance of a leer of this length are believed to be obvious. However, it is preferred that the annealing operation be a continuous one or, otherwise stated, that the glass be kept in constant motion during its travel through the leer to prevent sagging thereof.

In its broad aspect, the present invention contemplates the provision of an improved method of and apparatus for facilitating, expediting, and improving generally the production of sheet glass by an intermittent rolling operation. More particularly, an aim of the invention is to provide a method and apparatus whereby a mass of molten glass may be rapidly reduced to sheet form and the sheet subsequently annealed while traveling at a relatively slower speed. Thus, the invention aims to provide such a method and apparatus which will embody those advantages incident to the rapid reduction of the molten glass to sheet form and likewise, the advantages which result from slower annealing of the glass.

Another object of the invention is the provision of such a method and apparatus wherein a plurality of successive sheets of glass are adapted to be formed at predetermined intervals and at a relatively high rate of speed, each sheet being carried forwardly as it is formed into and through an annealing leer, the speed of travel of the sheet through the leer being materially reduced during that interval between the formation of successive sheets while the speed of travel of said sheet is temporarily increased during the period of formation of each succeeding sheet. In this manner, the speed at which the sheet is passed through the leer will be intermittently varied and during the greater portion of the time required for annealing, the sheet will travel through the leer at a relatively slow speed.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through apparatus constructed in accordance with the present invention.

Fig. 2 is a diagrammatic view of the driving means.

Fig. 3 is an elevation of the speed change gearing.

Fig. 4 is a view similar to Fig. 1 but showing different conveying means for the sheet, and Fig. 5 is a diagrammatic view of the driving means for the apparatus of Fig. 4.

Referring to the drawings, 5 designates a receiver or support adapted to receive thereupon a mass of molten glass 6. This mass of glass is preferably supplied to the receiver 5 when the same is in a substantially horizontal position, as indicated by the broken lines in Fig. 1, from a pot 7 also indicated in broken lines. Ordinarily, the receiver 5 is of such a size as to support thereupon the entire contents of pot 7.

Associated with one end of the receiver 5 is a pair of forming rolls 8 and 9 arranged to create a sheet forming pass therebetween through which the molten glass 6 is moved and reduced to a sheet 10 of substantially predetermined and uniform thickness. As illustrated, the receiver 5 and upper forming roll 8 may be movable as a unit about the axis of rotation of the lower forming roll 9, so that after the glass 6 is deposited upon the receiver, while in a horizontal position, the said receiver may be tilted to the position indicated by the full lines to advance the glass downwardly between the forming rolls.

As above brought out, it is desirable that the sheet of glass 10 be formed at a relatively high rate of speed, and the rolls 8 and 9 are consequently rotated in a manner that their peripheral speed will be such that they will function to rapidly reduce the mass of molten glass to sheet form. An inclined runway 11 may be positioned as indicated to receive the sheet 10 issuing from the sheet forming pass and to guide and deposit the same upon a horizontally disposed conveyor 12.

The sheet 10 is adapted to pass from the conveyor 12 onto a second and preferably similar conveyor 13 and from said second conveyor onto a third conveyor 14. From the conveyor 14, the sheet is delivered into an annealing leer 15 wherein it is supported and carried along by a plurality of spaced rollers 16. Of course, the invention is not to be restricted to the use of the three conveyors 12, 13 and 14 since one or any desired number of such conveyors may be used. Likewise, any other desired type of conveying means may be substituted for the leer rollers 16. Rollers 17 may be positioned between adjacent conveyors to facilitate the passage of the sheet from one conveyor to the next conveyor, while a hood 18 may be provided to protect the sheet while on said conveyors and during its passage from the rolling mechanism to the leer.

The conveyors 12, 13 and 14 are preferably of the same construction, each comprising an endless belt formation trained about drums or sprockets 19 and 20 mounted upon shafts 21 and 22 respectively. Positioned beneath the upper horizontal run of each belt conveyor is a table 23 designed to support the same in a manner that it will present a flat surface for the sheets of glass 10 resting thereon.

In the operation of the apparatus above described, the forming rolls 8 and 9, conveyors 12, 13 and 14, and leer rollers 16, are adapted to be driven in unison intermittently at different but corresponding speeds. That is, during the reduction of the mass of molten glass 6 to sheet form, the forming rolls 8 and 9 are adapted to be driven at a relatively high rate of speed to rapidly reduce the glass to sheet form, and the conveyors 12, 13 and 14 and leer rollers 16 are adapted to be driven at the same speed so that as the sheet is formed and deposited upon the conveyors, it will be carried forwardly at a speed equal to the speed of formation thereof. After the entire sheet has been deposited upon the conveyors, however, the speed of the forming rolls is materially reduced and simultaneously, the speed of the conveyors and leer rollers is likewise reduced so that the sheet will be carried forwardly at a relatively slower rate of speed. This reduced speed is maintained during that interval which elapses between the completion of one sheet and the rolling of the next succeeding sheet. However, upon the formation of a second sheet, the speed of the forming rolls, conveyors and leer rollers is again increased or speeded up. In this manner, the speed of the forming rolls, conveyors and leer rollers is synchronized at all times, such speed being relatively high during the formation of each sheet and being relatively slower during the interval between the formation of successive sheets. The sheets are therefore caused to travel through the leer intermittently first at a relatively high rate of speed and then at a relatively lower rate of speed.

To explain more fully, and by way of example only, let us assume that each sheet of glass is rolled or formed at the rate of sixty feet per minute. Therefore, during the formation of the sheet the forming rolls, conveyors and leer rollers are all operated so that their surfaces will move at the rate of sixty feet per minute. After the entire sheet is supported upon the conveyors, the speed of the sheet forming rolls, conveyors and leer rollers is simultaneously reduced to say two feet per minute and the sheet is carried forwardly to and through the leer at this reduced rate of speed until it is desired to form another sheet. During the formation of the second sheet, however, the speed of the forming rolls, conveyors and leer rollers is again increased to sixty feet per minute so that the already formed sheet will be carried through the leer at the rate of sixty feet per minute so long as the second sheet is being formed or, in other words, for one minute. After the second sheet is completed and deposited upon the conveyors, the speed of travel of the sheets being carried forwardly is again reduced until it is desired to form a third sheet whereupon the above cycle of operations is repeated. Thus, the sheet is formed at a relatively high rate of speed and subsequently annealed while traveling first at a relatively slow speed and then at a relatively high speed.

It will be apparent, that in the event the sheet were formed at the rate of sixty feet per minute and it took sixty minutes to anneal the glass and the sheet was passed through the leer at a speed equal to the speed of formation thereof, the length of the leer would have to be 3600 feet. According to the present invention, however, the length of leer necessary to properly anneal the glass may be materially decreased and brought to within a more practical and desirable length. For instance, let us assume that with the apparatus disclosed, one sheet of glass is adapted to be rolled or formed every seven minutes. The sheet is formed at a rate of sixty feet per minute and during this minute the forming rolls, conveyors and leer rollers, together with any sheets which may be supported upon the latter, will be traveling at this high rate of speed. As soon as the sheet is deposited upon the conveyors, however, such speed is reduced to say two feet per minute and this speed of two feet per minute is maintained for the next succeeding six minutes. The sheet will therefore travel at a rate of seventy-two feet in seven minutes with an average speed of ten feet per minute through the annealing leer. Therefore, if sixty minutes be required to anneal the glass and the glass travels through the leer at an average speed of ten feet per minute, the leer would be approximately 600 feet long, which is not an impractical or undesirable length. In this manner, the sheet is kept constantly in motion at all times to prevent sagging thereof and a continuous annealing operation is had. While, after the sheet is formed and passed into the leer, it is at intervals caused to travel at the speed equal to the speed of formation, yet the sheet is annealed while traveling at an average speed much slower than the speed of formation thereof so that it may be accurately stated that the sheet is formed at a relatively high speed and subsequently annealed while traveling at a relatively slower speed.

The means for driving the forming rolls, conveyors and leer rollers and for synchronizing the speed thereof includes a line shaft 24 extending longitudinally at one side of the leer 15 and carrying a plurality of worms 25 meshing with worm gears 26 carried at the ends of the leer rollers 16 so that upon rotation of the shaft 24, the leer rollers will be driven in unison and at the same speed. Arranged longitudinally along one side of the conveyors 12, 13 and 14 is a line shaft 27 having keyed thereto worms 28 which mesh with worm gears 29 mounted upon the shafts 22 of the conveyors 12, 13 and 14. Of course, the shafts 21 of the conveyors may be positively driven in lieu of the shafts 22 if desired, or both shafts may be positively driven as preferred. Upon rotation of the line shaft 27, the conveyors 12, 13 and 14 will be driven as a unit. The shaft 24 is adapted to be driven from shaft 27 and any desired drive connections may be provided therebetween. For instance, each shaft may carry a suitable sprocket and about which sprockets may be trained a sprocket chain 30.

The numeral 31 designates a third shaft, hereinafter termed the drive shaft, and upon which is mounted a worm 32 meshing with a worm gear 33 carried by the lower forming roll 9. The upper forming roll 8 is driven from and in a direction opposite to the direction of rotation of the lower forming roll through the intermeshing gears 34. The shaft 27 is driven from the shaft 31 in any suitable manner such as through a sprocket and chain connection 35. From the above, it will be seen that upon rotation of the drive shaft 31, the forming rolls, conveyors and leer rollers will be driven in synchronism.

In Fig. 3 is represented diagrammatically one method for varying the speed of the forming rolls, conveyors, and leer rollers. This speed changing mechanism is mounted within a housing or the like 36, through which projects the drive shaft 31, said drive shaft carrying gears 37 and 38. Also mounted within the housing, in parallel relation to the shaft 31, is a shaft 39 upon which are loosely mounted gears 40 and 41. The shaft 39 is driven from any suitable source of power and in any desired manner such as through a sprocket and chain connection 42. Also mounted upon shaft 39 is a clutch member 43 slidable between the gears 40 and 41. Each of the gears is provided with a member adapted to cooperate with the clutch member 43 so that when said clutch member is moved to engage the gear 40, the said gear will be positively driven and when moved to engage the gear 41 this gear will be positively driven. When the clutch member is moved to engage the gear 40, the drive shaft will be driven at a relatively high rate of speed through gears 37 and 40 and this constitutes the high speed gearing for the forming rolls, conveyors and leer rollers. Also mounted within the housing 36 is a shaft 45 carrying gears 46 and 47, the gear 46 meshing with gear 41 on shaft 39, and the gear 47 meshing with gear 48 on shaft 49. The shaft 49 also carries a second gear 50 meshing with gear 38 upon shaft 31. When the clutch member 43 is moved to engage and drive the gear 41, the shaft 31 will be driven at a materially reduced speed through the train of gears 41, 46, 47, 48, 50 and 38. This constitutes the slow speed gearing for the forming rolls, conveyors, and leer rollers.

In Figs. 4 and 5 is illustrated a somewhat modified arrangement. The apparatus herein illustrated is substantially the same as that described above and illustrated in Figs. 1 and 2 with the exception that the use of the conveyors 12, 13 and 14 is eliminated and a plurality or series of rollers 51 substituted therefor. These rollers are in substantial horizontal alignment with the leer rollers 16 and are adapted to receive the glass sheet 10 from the forming or rolling mechanism and feed the same into said leer. The conveying rollers 51 are adapted to be driven in unison with the forming rolls 8 and 9 and leer rollers 16 in the same manner as are the conveyors 12, 13 and 14 of Fig. 1. In order to drive the forming rolls, conveying rollers and leer rollers in synchronism, there may be provided a line shaft 52 extending longitudinally at the side of the leer and at the corresponding ends of the conveying rollers 51. This shaft is herein shown as carrying a plurality of worms 53 meshing with worm gears 54 carried by conveying rollers 51 and also with worms 55 meshing with worm gears 56 carried by leer rollers 16. The line shaft 52 is adapted to be driven from the drive shaft 31 which also functions to drive the forming rolls 8 and 9 in the manner above described.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In glass apparatus, intermittent sheet forming means, a leer, means for receiving the sheet from the forming means and conveying it through said leer, and means for driving the conveying means in a manner to carry the sheet through the leer intermittently first at a relatively high speed and then at a relatively slow speed, said conveyor advancing the sheet continuously forward through said leer.

2. In glass apparatus, sheet forming means, a leer, means for receiving the sheet and conveying it through said leer, and means for driving the sheet forming means and conveying means in unison intermittently at different but corresponding speeds so that the sheet is carried through the leer alternately at high and low speeds.

3. In glass apparatus, sheet forming means, a leer, means for receiving the sheet from the forming means and conveying it through said leer, means for driving the sheet forming means and conveying means in synchronism at a relatively high rate of speed during the formation of the sheet, and a common means operable for reducing the speed of said forming means and conveying means after the sheet has been deposited upon the latter while maintaining them in synchronism.

4. The method of producing sheet glass, which consists in forming the sheet at a relatively high rate of speed, carrying the sheet forwardly as it is formed at a speed equal to the speed of formation thereof, annealing the sheet, and in intermittently decreasing and then increasing the speed of travel of the sheet at predetermined intervals during the annealing thereof.

5. The method of producing sheet glass, which consists in forming a plurality of successive sheets of glass at predetermined fixed intervals and at a relatively high rate of speed, passing each sheet after it is formed into and through an annealing chamber, reducing the speed of travel of the sheet through the annealing chamber during that interval between the formation of successive sheets, and in then again increasing the speed of travel of the sheet during the formation of each succeeding sheet.

6. The method of producing sheet glass, which consists in forming a plurality of successive sheets of glass at predetermined fixed intervals, passing each sheet after it is formed into and through an annealing chamber, carrying the sheet through the chamber at a speed equal to the speed of formation of the succeeding sheet during the time said sheet is being formed and in varying the speed of travel of the sheet through the chamber during the interval between the formation of successive sheets.

7. The method of producing sheet glass, which consists in forming a plurality of successive sheets of glass at predetermined intervals and at a relatively high rate of speed, passing each sheet after it is formed into and through an annealing chamber, carrying the sheet through the chamber at a speed equal to the speed of formation of the sheets during the periods in which succeeding sheets are formed, and in reducing the speed of travel of the sheet through the chamber during the interval between the formation of successive sheets.

8. The method of producing sheet glass, which consists in forming the sheet at a relatively high rate of speed, carrying the sheet forwardly and delivering it into an annealing chamber, and in carrying the sheet through said chamber alternately at high and low speeds.

9. In glass apparatus, sheet forming means, a leer, conveying means for receiving the sheet from the forming means and carrying it through said leer, and means for driving said conveying means at different speeds to intermittently decrease and then increase the speed of travel of the sheet at predetermined intervals as it is carried through said leer.

10. In glass apparatus, means for forming successive sheets of glass, an annealing leer, conveying means for receiving the sheet from the forming means and carrying it through said leer, means for driving the conveying means in synchronism with the forming means during the formation of successive sheets, and means for reducing the speed of the conveying means and thus the speed of the sheets carried thereby during the interval between the formation of successive sheets.

11. The process of forming and annealing sheet glass, consisting in reducing a mass of molten glass to sheet form at a predetermined rate of speed, carrying the sheet forwardly into and through an annealing chamber, and in successively decreasing, increasing, and then decreasing the speed of travel of the sheet during its forward travel and while maintaining the same in constant motion.

Signed at Toledo, in the county of Lucas and State of Ohio, this 18th day of October, 1928.

JOHN L. DRAKE.